Patented Dec. 3, 1940

2,223,930

UNITED STATES PATENT OFFICE 2,223,930

AMINE RESINS

Robert Griessbach, Wolfen, Kreis Bitterfeld, Erhard Meier, Bitterfeld, and Hans Wassenegger, Dessau in Anhalt, Germany, assignors to I. G. Farbenindustrie Aktiengesellschaft, Frankfort-on-the-Main, Germany No Drawing. Application November 4, 1937, Serial No. 172,766. In Germany December 5, 1936

8 Claims. (Cl. 260—72)

Our present invention relates to a process for manufacturing new and valuable artificial resins and to the new products obtainable by this process.

Another object of our invention comprises the application of the said resins for removing acid constituents from gases or liquids and for exchanging anions.

Further objects of our invention may be seen from the detailed specification following hereafter.

It is known that by condensing aromatic amines with formaldehyde in various ratios so-called amine resins are produced which find manifold application. The resinous masses, in some cases after a hardening treatment, have plastic properties and serve for the production of artificial masses. By observing certain conditions of operating, bodies having adsorption capacity are obtained and these are useful for purifying liquids, gases or the like.

The present invention is based on the observation that bodies having very valuable and manifold properties, are obtainable by subjecting such aliphatic basic compounds to a resinifying process which are built up with the molecular grouping—[HN—(CH$_2$)$_m$]—in which formula $m$ is a whole number viz: 1, 2, 3 or 4. Products of this kind are, for instance, polyethyleneimine of the formula —HN—C$_2$H$_4$[HN—C$_2$H$_4$]$_x$NH—C$_2$H$_4$— and polyethylenediamine of the formula H$_2$N—C$_2$H$_4$[HN—C$_2$H$_4$]$_y$NH—C$_2$H$_4$NH$_2$ The chemical composition of similar compounds such as the corresponding propylene compounds may easily be seen from these formulae.

For resinifying the said compounds we treat them with aliphatic polyhalogen hydrocarbons or their equivalents. Among suitable polyhalogen hydrocarbons are, for instance, methylene chloride, 1.2-dichloroethane, 1.2- or 1.3-dichloropropane, 1.2- or 1.3-dichlorobutane or the corresponding bromides or iodides. There may also be used aromatic bodies which contain halogen in at least two side chains, for instance, 1.3-dimethyl-4.6-chloromethylbenzene.

In a number of cases, particularly if mixed resins containing besides the aliphatic radicle mentioned above aromatic radicles, are produced (compare, for instance, Examples 6 and 10 to 13 following hereafter), instead of the said chlorinated hydrocarbons aldehydes, for instance, formaldehyde may be used as resinifying agent.

The basic compounds in question are easily obtainable according to known processes. Thus, the polyethyleneimine is formed by polymerization of ethyleneimine of the formula

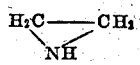

which occurs in an acid medium. Since in our resinifying process with halogenated hydrocarbons a hydrohalogen acid is split off, we may start with the monomeric imine which during the reaction is transformed for the greatest part in the polymer compound.

The polyethyleneamine, on the other hand, is formed by double decomposition of 1.2-diaminoethane with 1.2-dichloroethane; in this case we may start likewise from the said diamine which in a first stage of operation is transformed into the polyethyleneamine by reaction with 1.2-dichloroethane, the resinification being carried out with dichloroethane in excess over that required for the formation of the polyethyleneamine.

The resinification is carried out as follows:

The parent materials may be dissolved in a suitable solvent, for example water or alcohol, and thus brought into reaction with each other, a result which is generally hastened by gentle heating. The reaction sets in actively and with a rise of temperature which may be moderated by directly or indirectly cooling.

Resins obtained in this way are of gelatinous structure and may be hardened either by drying or by the action of a chemical, for instance, an aldehyde, so that finally solid resins are obtained which are soluble neither in water nor in the usual organic solvents; they are suitable for many uses. They may be applied alone or in admixture with known materials or filling agents for producing thermoplastic resins. Moreover they possess, particularly when produced through a gelatinous stage and hardened with retention of this structure, pronounced adsorption properties so that they lend themselves for technical application as adsorption agents. For this purpose the cautiously hardened resinous gel is converted by treatment with alkali lye first into the form of the free base. They then have a tendency to adsorb constituents of acid character from gases. Moreover, they may adsorb acid constituents from liquids so that, for instance, in combination with cation exchange bodies, they are applicable for removing salt from water or the like. Some of these new bodies also have a tendency to adsorb certain cations besides anions, therefore neutral salts, for example heavy metal salts;

that is to say both the acid and the basic constituent are retained by the adsorption agent.

The resins from aliphatic amines and polyhalogen hydrocarbons and the like may be produced alone or in admixture with other known resins, particularly amine and phenol resins. The production may be as follows: From the aromatic amine and formaldehyde there is produced a preliminary condensation product which is condensed with the also preliminarily condensed polyamine or polyimine and dihalogen hydrocarbon or aldehyde to form the finished resin. An aromatic aldehyde or an aliphatic aldehyde, in particular formaldehyde, may be substituted wholly or in part for the dihalogen hydrocarbon. Moreover, in its place the chlorination products of alkylamines, ethers, oxides or the like may be used.

The following examples illustrate the invention, the parts being by weight:

*Example 1.*—300 parts of polyethylene imine are dissolved in 500 parts of 1.2-dichloroethane and the solution is heated on the water bath at 30° C. A lively reaction begins. When the internal temperature has attained 70° C. the mass is cooled by ice or ice water. There is formed a yellowish gelatinous resin which is insoluble in water and in other known solvents. By drying it at 80° C. there is obtained a solid resin gel.

*Example 2.*—100 parts of polyethylene imine are caused to react with 166 parts of 1.2-dichloroethane at 30° C. The internal temperature rises and as soon as it has attained 50° C. there are added while strongly stirring 200 parts of formaldehyde solution of 30 per cent. strength and 20 parts of hydrochloric acid, whereupon there is formed immediately a colorless jelly. By drying this at 80° C. there is obtained a solid gel.

*Example 3.*—30 parts of polyethylene diamine are well stirred with 50 parts of 1.2-dichloroethane and the mixture is heated to about 60° C. In the course of about an hour there is formed a dark solid resinous mass which is dried at about 80° C.

*Example 4.*—150 parts of an aqueous ethylene imine solution of 7.4 per cent. strength is caused to react with 10 parts of $\beta,\beta'$-dichlorodiethylamine while strongly cooling externally so that the internal temperature does not exceed $+20°$ C. There is thus produced a thick syrup which is transformed into a bright jelly by addition of 100 parts of formaldehyde solution of 30 per cent. strength; when dried at 80° C. this jelly becomes a solid resin insoluble in water and known organic solvents.

*Example 5.*—100 parts of ethyl alcohol are added to 50 parts of an aqueous ethylene imine solution of 7.4 per cent. strength, whereupon methylene chloride is gradually run in while the mass is cooled with ice. The internal temperature rises to about 50° C. and there is formed a syrupy solution which becomes a brown jelly on addition of 50 parts of formaldehyde solution of 30 per cent. strength and 10 parts of concentrated hydrochloric acid. When dry the jelly becomes a gummy resin. It is insoluble in water and organic solvents and finds many uses.

*Example 6.*—500 parts of 1.3-diaminobenzene are dissolved in 325 parts of water and 320 parts of hydrochloric acid with addition of 170 parts of ice. There are then added 450 parts of formaldehyde solution of 30 per cent. strength, 240 parts of ice and 300 parts of water, whereby a dark brown syrupy solution is produced. This is mixed immediately with a solution of 100 parts of polyethylene imine in 200 parts of water which has been made acid with concentrated hydrochloric acid. By addition of a further 510 parts of formaldehyde solution of 30 per cent. strength there is produced a dark brown jelly which becomes a hard resin on drying. This gel is insoluble in water, acids and alkalies as well as in the known organic solvents.

*Example 7.*—If in Example 6 there is used instead of the polyethylene imine a previously condensed polyethylene imine obtainable by the reaction of 50 parts of polyethylene imine in 100 parts of ethyl alcohol with 150 parts of 1.2-dichlorethane there is obtained a dark brown jelly which when dry passes into a gel having properties similar to those of the resin obtained as described in Example 6.

*Example 8.*—By substituting aniline for the 1.3-diaminobenzene used in Example 6, a bright colored resin is obtained which has properties of solubility similar to those of the resin obtained as described in Example 6.

The resin obtained as described in Examples 6, 7 and 8 may be used as thermoplastic masses.

*Example 9.*—150 parts of polyethylene imine are caused to react at 35° C. with 50 parts of 4'6' - dichloro-1.3.4.6-tetramethylbenzene dissolved in 50 parts of xylene. There is formed a transparent resinous mass which when dried at 80° C. yields a resin having valuable exchange properties.

*Example 10.*—To 1000 parts of a solution made by condensation of 2.5 parts of 1.3-diaminobenzene in 45 parts of water and 2.1 parts of hydrochloric acid of 32 per cent. strength with 2.4 parts of formaldehyde solution of 30 per cent. strength there are added while intimately mixing 50 parts of polyethylene diamine in 85 parts by volume of hydrochloric acid of 32 per cent. strength and 75 parts of water. To this mixture there are added quickly and while stirring well 330 parts of formaldehyde solution of 30 per cent. strength. With slight evolution of heat the mass solidifies after a few minutes to a solid resin which may be hardened at 80° C. This resin has good adsorption capacity for anions.

*Example 11.*—1200 parts of 1.3-diaminobenzene are dissolved in 1300 parts of water and 760 parts of concentrated hydrochloric acid. After cooling this solution to about 0° C. 300 parts of a solution of formaldehyde of 30 per cent. strength are added. When this solution has become warm (10° C.) a solution of 150 parts of ethylene diamine hydrate in 450 parts of water and 585 parts of hydrochloric acid and immediately 1500 parts of the formaldehyde solution are added while thoroughly stirring. The solution solidifies with evolution of heat (60 to 70°) under formation of a gel. After drying at 80° C. and disintegration grains are obtained which have an outstandingly good adsorption capacity for anions.

*Example 12.*—A solution of 40 parts of 1.3-diaminobenzene in 26 parts of water and 25.5 parts of concentrated hydrochloric acid is cooled to about 0° to 5° C. and to this solution while stirring 36 parts of a formaldehyde solution of 30 per cent. strength diluted with 20 parts of water and likewise cooled with ice, are added. After a short time, 4 parts of polyethylene diamine dissolved in 16 parts of water and such an amount of hydrochloric acid that the solution is weakly acid, are introduced. Finally, there are added 40 parts of the formaldehyde solution. After a short time, with slight evolution of heat the mass solidifies to form a clear gel, which is hardened by heating to 80° C.

In the foregoing example the polyethylene diamine may be substituted by the same quantity of polyethylene imine.

*Example 13.*—To a solution of 46.5 parts of aminobenzene in 100 parts of water, 100 parts of methanol and 51.5 parts of concentrated hydrochloric acid, are added at about 0° C. 25.5 parts of a formaldehyde solution of 30 per cent. strength. When the mixture has become warm (40° C.), there are then added a solution of 25 parts of polyethylene imine in 31 parts of water and 40 parts of hydrochloric acid. After addition of further 97.5 parts of the formaldehyde solution the formation of a solid gel occurs with slight evolution of heat, which after drying forms a hard resin.

The proportions of the components used and the conditions of working named in the foregoing examples may be varied according to the purpose for which the products are required. Thus on the one hand resin jellies may be produced which by cautious drying are converted into resins of valuable exchange properties or resins having highly elastic rubber-like properties as well as thermoplastic masses which in part in admixture with known condensation resins may be converted into moulded bodies having valuable properties.

As already stated the resins obtained by the foregoing examples may be used for the purification of liquids, gases and the like since they show good properties of adsorption. This may be seen by filtering through such a body a neutral salt solution, whereby there is obtained an essentially greater decomposition of the neutral salt than when the same solution is filtered through a known anion exchange body. The new resins also show an extraordinarily high adsorption capacity, which may amount to 20 per cent. or more of their weight of the constituents to be adsorbed. Exchange bodies with particularly good properties are those which exist in gel form and are capable of hardening by passing over the jelly stage. For some purposes mixed condensation products of aromatic and aliphatic amines with aldehydes or poly-halides are suitable in that in part they exhibit higher mechanical strength than is shown by the resins made from one pair of components alone.

For the adsorption of acid constituents from gases the preferably moist gas is passed over the gel regenerated to free base, whereby the acid constituent of the gas, for example $SO_2$ or $CO_2$, is fixed with formation of salt.

When it is required to separate acid constituents from liquids the solution is filtered through the resin, in which case also the acid constituents are added to the resin base. Exchange of the anion of the solution for the hydroxylion or another anion attached to the resin occurs. The charged resin is regenerated in known manner by treatment with a salt solution, particularly with a dissolved base, for example ammonia water, caustic soda lye or sodium carbonate solution. Some of the bodies in question are such strong bases that they have a tendency to react with salts of cations forming sparingly soluble hydroxides, for instance, heavy metal salts, in such a manner that both anion and cation are retained by the resin body. This property of the new resin bodies in consequence of their strong basic character to precipitate selectively heavy metal cations as hydroxides or amin complexes may be utilized for separating these metals from dilute solutions, particularly moist liquors. For example, if a neutral solution of copper sulfate is filtered through one of these resins neither sulfate ion nor copper ion can be recognized in the filtrate. Even dilute ammoniacal copper solutions may be decoppered in this manner. The resin may be regenerated by treatment with ammonia.

The strongly basic character of the resin in question is also shown by the fact that neutral salts with strong bases may be split by filtering their aqueous solutions through the resin, the anion being adsorbed. The strong base thus liberated, for example NaOH, may be titrated in the filtrate.

These applications of the resins are illustrated in the following examples:

*Example 14.*—Through a resin made from polyethylene imine and ethylene chloride as described in Example 1, 2 or 3 there is filtered after regeneration with caustic soda lye which induces swelling a water which has previously been freed from alkaline earth ions and alkali ions by filtration through a cation exchange body and contains per liter 60 mg. of chlorion and 230 mg. of sulfate ion in the form of free acids. In this manner 80 liters of water are freed from the anions with an output of 25 liters per hour per liter of material. This corresponds with a capacity of 18 per cent of the weight of the material calculated on the equivalent mass of CaO. By means of an alkali, for example caustic soda lye of 4 per cent strength, the resin may be regenerated and rendered fit for reuse.

The resin has in high degree a tendency to split neutral salts and in this respect is stronger than the known resins. If an $n/4$ common salt solution is filtered through the above resin regenerated by means of caustic soda lye the resin becomes charged with 13 per cent of its dry weight of chlorions. The corresponding quantity of free alkali may be found by titration in the filtrate.

By filtering an $n/4$ sodium sulfate solution through the regenerated resin the adsorbed quantity of $SO_4$ amounts to 27 per cent of the dry weight of the resin.

The resin may be used to adsorb a solution of copper sulfate of 10 per cent strength, the copper being fixed as an amine complex and the sulfate with formation of salt. In this case passage of concentrated ammonia solution through the resin serves for regeneration. The capacity calculated on the dry resin amounts to 6.35 per cent. of copper.

*Example 15.*—Through a resin made from ethylene imine and methylene chloride in alcoholic solution (compare Example 5) there is filtered after the resin has been treated with caustic soda lye an ammoniacal copper solution containing 160 mg. of copper and 600 mg. of ammonia per liter. The copper is selectively adsorbed while the ammonia passes into the filtrate. The resin adsorbs 3 to 4 per cent. of its dry weight of copper and may be regenerated by means of concentrated ammonia solution.

*Example 16.*—Through a resin made from metaphenylene diamine, polyethylene imine and formaldehyde there is filtered after regeneration by means of caustic soda lye the water described in Example 14. With an output of 5 liters per hour per liter of material 100 to 120 liters of this water are completely freed from the anions.

which corresponds with a capacity of 4.2 per cent. by weight calculated on the equivalent quantity of calcium oxide. In the filtrate there is neither SO₄ ions nor Cl ions to be detected by means of barium chloride or silver nitrate respectively.

*Example 17.*—Through 40 cc. of a resin of grain size 0.5 to 2 mm. made from polyethylene imine and methylene chloride there are filtered after regeneration with caustic soda lye 100 cc. of $n/4$ common salt solution. The filtrate consumes 43.8 cc. of $n/10$ hydrochloric acid while from the resin the equivalent quantity of hydrochloric acid can be regenerated by means of caustic soda lye.

The resin made from meta-phenylene diamine has a smaller capacity for splitting neutral salts. Under the same conditions of operation only 13.5 cc. of $n/10$ hydrochloric acid are consumed.

Results equally satisfactory as those obtained as described in Examples 14 to 17 attend the use of resins made from polyethylene imine, methylene chloride and formaldehyde. For the polyhalide there may be wholly or in part substituted aldehyde, halogenated ether or a halogenated alkylamine.

Thus there is obtainable a number of resins having graded mechanical properties and adsorption capacity so that any particular requirements in practice may be fulfilled. By using resins made by mixed condensation of phenols and polyamines or polyimines there are at hand bodies which are suitable for selective adsorption and by reason of their amphoteric character are advantageous buffer filters.

What we claim is:.

1. The process which comprises resinifying 1.3-diamino benzene and a member of the group consisting of polymerized ethylene imine, polymerized propylene imine, polyethylene diamine (a high molecular condensation product of ethylene chloride and ammonia), and polypropylene diamine (a high molecular condensation product of propylene chloride and ammonia) with formaldehyde.

2. The process which comprises resinifying 1.3-diaminobenzene and polymerized ethylene imine with formaldehyde.

3. The process which comprises resinifying 1.3-diaminobenzene and polyethylene diamine (a high molecular condensation product of ethylene chloride and ammonia) with formaldehyde.

4. The process which comprises resinifying 1.3-diamino benzene and a member of the group consisting of polymerized ethylene imine, polymerized propylene imine, polyethylene diamine (a high molecular condensation product of ethylene chloride and ammonia), and polypropylene diamine (a high molecular condensation product of propylene chloride and ammonia), with formaldehyde, and a member of the group consisting of methylene chloride, 1.2-dichloroethane, 1.2- and 1.3-dichloropropane, bis-(halogenoalkyl)-amines and bis-(halogenoalkyl)-benzenes.

5. The process which comprises resinifying 1.3-diaminobenzene and polymerized ethylene imine with formaldehyde and 1.2-dichloroethane.

6. The process which comprises resinifying 1.3-diaminobenzene and polyethene diamine (a high molecular condensation product of ethylene chloride and ammonia) with formaldehyde and 1.2-dichloroethane.

7. The resins identical with those obtained according to claim 1, said products having ion exchanging properties.

8. The resins identical with those obtained according to claim 4, said products having ion exchanging properties.

ROBERT GRIESSBACH.
ERHARD MEIER.
HANS WASSENEGGER.